United States Patent
Bedros et al.

(10) Patent No.: US 8,861,802 B2
(45) Date of Patent: Oct. 14, 2014

(54) FACE IMAGE PRIORITIZATION BASED ON FACE QUALITY ANALYSIS

(75) Inventors: Saad J. Bedros, West St. Paul, MN (US); Pedro Davalos, Plymouth, MN (US); Ben Miller, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 123 days.

(21) Appl. No.: 13/419,142

(22) Filed: Mar. 13, 2012

(65) Prior Publication Data

US 2013/0243268 A1 Sep. 19, 2013

(51) Int. Cl.
*G06K 9/00* (2006.01)
(52) U.S. Cl.
USPC ........... 382/118; 382/100; 382/181; 382/165; 382/224; 382/260
(58) Field of Classification Search
None
See application file for complete search history.

(56) References Cited

U.S. PATENT DOCUMENTS

| | | | |
|---|---|---|---|
| 7,324,671 B2 * | 1/2008 | Li et al. ......................... | 382/118 |
| 7,403,643 B2 * | 7/2008 | Ianculescu et al. ........... | 382/118 |
| 7,757,171 B1 * | 7/2010 | Wong et al. ................... | 715/719 |
| 8,442,327 B2 * | 5/2013 | Sebe et al. .................... | 382/224 |
| 2007/0201726 A1 * | 8/2007 | Steinberg et al. ............. | 382/103 |
| 2010/0026842 A1 * | 2/2010 | Ishizaka ..................... | 348/231.2 |
| 2012/0148157 A1 * | 6/2012 | Kumar et al. ................ | 382/173 |

* cited by examiner

*Primary Examiner* — Jason M Repko
*Assistant Examiner* — David Perlman
(74) *Attorney, Agent, or Firm* — Honeywell International Inc.

(57) ABSTRACT

Methods, machine-readable media, and devices for face image prioritization based on face quality analysis are described herein. For example, one or more embodiments include detecting a facial image in an image that has been acquired by a camera that monitors a scene, passing the facial image through a number of quality analysis filters that include a number of quality analysis factors, wherein processing complexity associated with the number of quality analysis factors increases consecutively, and submitting the facial image to a facial recognition program upon a determination that the facial image has passed the number of quality analysis filters.

17 Claims, 3 Drawing Sheets

---

DETECTING A FACIAL IMAGE IN AN IMAGE THAT HAS BEEN ACQUIRED BY A CAMERA THAT MONITORS A SCENE — 102

PASSING THE FACIAL IMAGE THROUGH A NUMBER OF QUALITY ANALYSIS FILTERS THAT INCLUDE A NUMBER OF QUALITY ANALYSIS FACTORS, WHEREIN PROCESSING COMPLEXITY ASSOCIATED WITH THE NUMBER OF QUALITY ANALYSIS FACTORS INCREASES CONSECUTIVELY — 104

SUBMITTING THE FACIAL IMAGE TO A FACIAL RECOGNITION PROGRAM UPON A DETERMINATION THAT THE FACIAL IMAGE HAS PASSED THE NUMBER OF QUALITY ANALYSIS FILTERS — 106

FACE IMAGE PRIORITIZATION BASED ON FACE QUALITY ANALYSIS

GOVERNMENT RIGHTS

The subject matter of this disclosure was made government support under Government Contract Number N65236-02-D-7839 awarded by the U.S. Navy—SPAWAR Systems Center. Accordingly, the U.S. Government has certain rights to subject matter disclosed herein.

TECHNICAL FIELD

The present disclosure relates to methods, machine-readable media, and devices for face image prioritization based on face quality analysis.

BACKGROUND

Video surveillance-based facial recognition can be used in some locations to determine an identity of an individual in a monitored environment. Video surveillance can involve identifying a presence of an individual and/or a location of an individual. This can be accomplished by processing an image to locate a person. However, processing the image to locate a person can involve complex processing.

In an example, an amount of data associated with the image can increase with a resolution of the image. As a result of the increase in data, the complexity of the processing can increase. To address these issues, some systems have employed a first stationary, wide-angle, low-resolution camera to acquire images to locate individuals. The low-resolution camera acquires images that are processed more quickly due to a relatively small amount of data in a low-resolution image.

Once an individual is located, that location can be provided to a second, higher resolution, motor-driven camera that is able to articulate and acquire a higher resolution image of a located individual. The higher resolution image can then be provided to a facial recognition program for processing. However, the higher resolution images typically include a scene of more than just an individual's face, which is noise that must be eliminated or ignored by the facial recognition process, thus resulting in more complex processing.

Alternatively, and/or in addition, a large number of low-resolution and/or higher resolution images can be acquired by a camera when performing video surveillance-based facial recognition. The large number of images can cause an increase in data that must be processed, thus increasing the complexity of processing.

Alternatively, and/or in addition, a speed at which the higher resolution camera can articulate to acquire a higher resolution image of a located individual can be limited due to a mechanical drive system of the camera. For example, the higher resolution camera may have to pan to the location of the individual that has been identified by the lower-resolution camera. As a result, the higher resolution camera may not be able to pan to the location of the individual due to the time it takes for the mechanical drive system to move the higher resolution camera.

DETAILED DESCRIPTION

Figure 1:
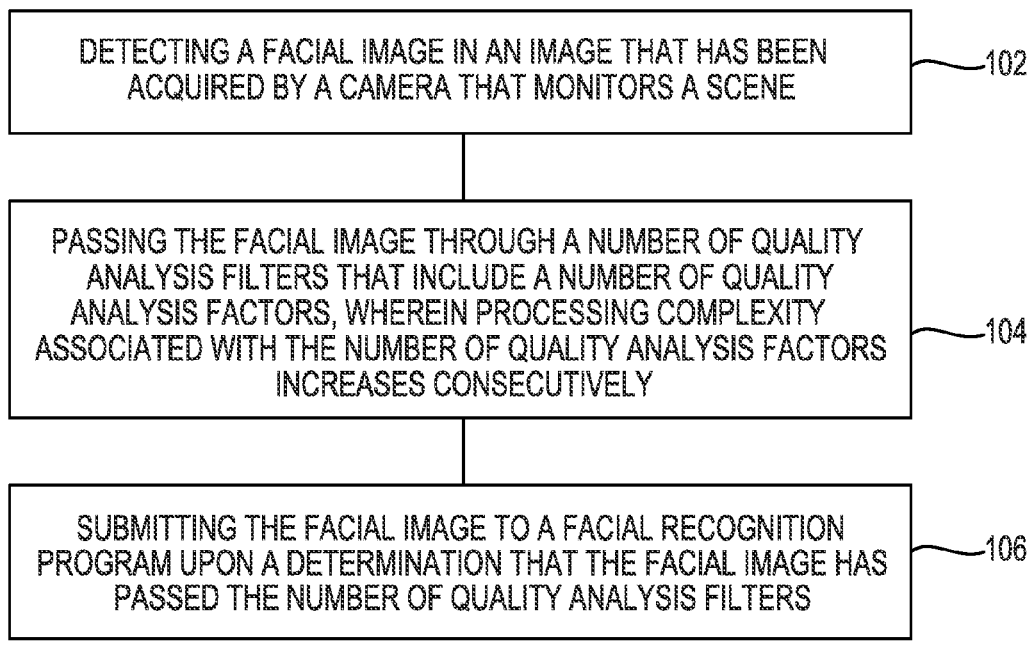
FIG. 1 illustrates a method for face image prioritization based on face quality analysis according to one or more embodiments of the present disclosure.

Methods, machine-readable media, and devices for face image prioritization based on face quality analysis are described herein. For example, one or more embodiments include detecting a facial image in an image that has been acquired by a camera that monitors a scene, passing the facial image through a number of quality analysis filters that include a number of quality analysis factors, wherein processing complexity associated with the number of quality analysis factors increases consecutively, and submitting the facial image to a facial recognition program upon a determination that the facial image has passed the number of quality analysis filters.

A large amount of data can be processed by facial recognition programs, for example, a camera can acquire a number (e.g., hundreds, thousands) of frames of a particular scene that the camera is monitoring, which can then be processed by the facial recognition program to determine an identity and/or location of one or more individuals in each frame, for example. The amount of data included in the number of frames can cause the complexity of processing operations to increase, which in turn can slow the speed at which the facial recognition program can identify and/or locate one or more of the individuals in each frame.

Some embodiments of the present disclosure can reduce a complexity of processing operations involved with processing a facial image of one or more individuals in facial recognition systems. In an example, embodiments can filter images that are submitted to a facial recognition program with quality analysis filters. For instance, images that meet quality analysis factors associated with each of the quality analysis filters can be submitted to the facial recognition program. Alternatively, and/or in addition, images that do not meet the quality analysis factors can be directed away (e.g., discarded or stored in memory) from the facial recognition program.

As such, the amount of data provided to the facial recognition program can be reduced because a prioritization of facial images that are submitted to the facial recognition program can be made based on the filtering of the images. This can allow for faster facial recognition by the facial recognition program.

Some embodiments of the present disclosure can prioritize a track of facial images to reduce a complexity of processing operations involved with processing a facial image of one or more individuals in facial recognition systems. A track of facial images can be defined as a group of facial images from different frames that are likely of the same individual. In an example, a low priority can be assigned to a track of facial images that have been identified and/or are of an acceptable quality in relation to a track of facial images that no processing has been completed on, which can be assigned a high priority. Further image processing can then be completed on the track of facial images that has been assigned a high priority, rather than on the track of facial images that has been assigned a low priority, thus allowing for conservation of processing resources used by the facial recognition program.

Some embodiments of the present disclosure can link tracks of facial images that are fragmented and/or associate unidentified facial images to a track of facial images to allow for a continuous track of facial images. This can provide a user with an ability to see where an individual has been (e.g., a path taken by the individual).

Some embodiments of the present disclosure can delay filtering of a facial image based on a determination of when an overall image quality of the facial image will improve. Environmental factors can affect overall image quality. For example, a hallway with lights set a distance apart down the hallway can provide different lighting to different areas of the hallway.

As such, quality of a facial image may be better when an individual is at a location under one of the lights rather than when an individual is at a location between two lights, for example. Based on models of overall image quality, embodiments of the present disclosure can delay processing of a facial image until an individual is present in a place that provides an overall image quality suitable for processing by the facial recognition program. As a result, less facial images and/or facial images of a better overall quality can be provided to the facial recognition program, which can result in less processing done by the facial recognition program and faster facial recognition.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

As used herein, "a" or "a number of" something can refer to one or more such things. For example, "a number of differences" can refer to one or more differences.

FIG. 1 illustrates a method for face image prioritization based on face quality analysis according to one or more embodiments of the present disclosure. At block 102, the method can include detecting a facial image in an image that has been acquired by a camera that monitors a scene.

The scene can include the presence of a person. The camera may be a digital video camera and/or digital still image camera with suitable optics to acquire images of the scene as needed based on requirements for the particular embodiment and installation. In some embodiments, the optics may be adjustable to zoom and focus automatically or on command. The camera may be stationary or capable of panning and tilting automatically or on command. Such adjustments to the optics and camera, when included in a particular embodiment may be made automatically based on programmed patterns of observation, in response to manual commands input into a control system, or based on commands determined by a control system based on determined environmental changes within the assigned scene.

In some embodiments, the face in the image can be detected through a face model. The face model can include shape, motion, color, and/or texture, for example. Shapes can be used in the model to detect unique features of the face, such as eyes, mouth, nose, and/or ears that are defined by shapes that include a square, rectangle, triangle, oval, and/or circle, for example. Motion can be used to detect unique facial motions that include blinking of eyes, opening of the mouth, and/or movement of eyebrows, for example. Color can be used to detect unique patterns of color that are found in faces, such as hair and/or skin, for example. Texture can be used to detect features of the face that contain unique textures, such as skin, lips, and/or hair, for example.

Upon detection of the face in the image, the face can be isolated from the rest of the image to create a facial image. The facial image can consist of the face and/or areas surrounding the face (e.g., hair, neck, ears).

Some of the images acquired by the camera, and thus the facial image, can be of varying image qualities. For example, overall image quality can be affected by a face size of a face in the facial image, a brightness of the facial image, a dynamic range of pixels on the facial image, and/or sharpness of the facial image. Due to a varying overall image quality of images acquired by the camera, some of the images may not be suitable for processing with the facial recognition program.

Images of varying overall image quality can pose a challenge when a high number of images are being submitted to the facial recognition program. In an example, the image recognition program can have trouble processing an image that is not of a requisite quality for performing facial recognition. In addition, a high number of images can be submitted to the facial recognition program, which can cause an increased load on the facial recognition program contributing to an increased time that is taken to perform facial recognition.

For example, when the camera is a camera that acquires multiple images (e.g., frames) in a short period of time (e.g., has a rapid frame rate), such as a video camera, a facial image can be detected in each frame and then submitted to the facial recognition program. As discussed herein, this can result in an increased time that is taken to perform facial recognition.

In some embodiments, the facial images detected in each frame can be filtered with a number of quality analysis filters. In an example, the method includes, at block 104, passing the facial image through a number of quality analysis filters that include a number of quality analysis factors, wherein processing complexity associated with the number of quality analysis factors increases consecutively. Each of the number of quality analysis factors can be associated with each of the number of quality analysis filters.

The number of quality analysis factors can be factors associated with a quality of the facial image. In an example, the number of quality analysis factors can include face size; brightness of the facial image; dynamic range of the pixels on the facial image; a sharpness metric; a blur estimate; landmark estimates from eyes, nose, and mouth; facial pose; a shape fitting residual; and/or an overall image quality, although examples are not so limited.

The face size can be defined as a size of the face in the facial image. The brightness of the facial image can be defined as the luminous intensity of the facial image in a given direction per unit of projected area. The dynamic range of the pixels on the facial image can be defined as a ratio between maximum and minimum measurable light intensities of the facial image (e.g., white and black, respectively). The sharpness of the facial image can be defined as how clear the detail of the facial image is.

The blur estimate can include an estimate of an amount of blur of the facial image represented as a numerical value. Blur can exist due to an exposure speed of the camera and/or a speed of an object that the camera is acquiring an image of.

The landmark estimates from eyes, nose, and/or mouth can include a calculation of a distance between landmarks (e.g., features) on the face. For example, the eyes, nose, and mouth can be recognized as landmarks on the face and distances between the eyes, nose, and/or mouth can be calculated to determine whether the distances are within a requisite range for processing by the facial recognition program.

The facial pose can be defined as a pose of the face that is rotated by a degree of deviation from a normal position (e.g., frontal pose). Upon calculation of the facial pose, a determination can be made of whether the face is rotated by a degree of deviation too far from a normal position for processing by the facial recognition program.

The shape fitting residual can be defined as a difference between a mean of a set of shape observations and a present shape observation associated with the facial image. For example, a numerical value can be associated with a shape of the face (e.g., nose) in the facial image and can be compared with a mean numerical value associated with a group of faces to determine whether the numerical value associated with the shape of the face in the facial image is within a requisite range for processing by the facial recognition program.

The overall image quality can be defined as a summation and/or average of one or more values associated with each respective quality analysis factor. The overall image quality can be representative of whether the facial image is likely to provide a useful or credible outcome from the facial recognition program.

The number of quality analysis filters can be arranged in series such that the facial image can pass through a first, second, and third quality analysis filter, for example. As the facial image passes through each respective quality analysis filter, the facial image can be analyzed in terms of each respective quality analysis factor. Upon analysis of the facial image in terms of each respective quality analysis factor, the method can include determining whether the facial image passes the number of quality analysis filters.

In some embodiments, the method can include discarding the facial image when the facial image does not pass at least one of the number of quality analysis filters. For example, when the facial image does not pass at least one of the number of quality analysis filters, the facial image may not meet a threshold value associated with the quality analysis filter and can be deemed not suitable for submission to the facial recognition program. A facial image that is not suitable for submission to the facial recognition program can be a facial image, which if submitted, is unlikely to provide a useful or credible outcome. Thus, the facial image can be discarded.

Discarding the facial image can include deleting the facial image and/or removing the facial image from processing and preventing the facial image from being submitted to the facial recognition program. Alternatively, and/or in addition, when the facial image does not pass at least one of the first number of quality analysis filters, the facial image can be stored in a memory. Storing the facial image in the memory can allow for the facial image to be referenced and/or later analyzed.

In some embodiments, the method can include arranging the number of quality analysis filters in order of increasing complexity of the quality analysis factors associated with each of the number of quality analysis filters. In an example, processing associated with a first quality analysis factor can be less complex than processing associated with a second quality analysis factor.

For instance, face size can be a first quality analysis factor associated with a first quality analysis filter; brightness can be a second quality analysis factor associated with a second quality analysis filter; dynamic range of pixels on the facial image can be a third quality analysis factor associated with a third quality analysis filter; and a fast sharpness metric can be a fourth quality analysis factor associated with a fourth quality analysis filter. Alternatively, and/or in addition, the first, second, third, and fourth quality analysis factors can be associated with a single quality analysis filter.

By arranging the number of quality analysis filters in order of increasing complexity of the quality analysis factors, the least amount of processing can be performed on images that are not of a requisite quality for processing by the facial recognition program. For example, an image that does not have a requisite face size for processing by the facial recognition program can be discarded and/or stored in the memory. In discarding the facial image and/or storing the facial image in memory, minimal processing resources can be used because the processing involved with determining that the face size is too small in the facial image is less intensive than processing the facial image with the facial recognition program and/or determining that the facial image does not have a requisite sharpness metric, among other quality factors, for example.

As a result of less processing resources being used, the facial recognition program can perform facial recognition faster because images that are not of a requisite quality can be filtered from a series of facial images submitted to the facial recognition program. As a result, images of a higher quality can be provided to the facial recognition program and/or less images can be provided to the facial recognition program. Alternatively, and/or in addition, less processing resources can be used when filtering the facial images because the facial images are filtered by the number of quality analysis filters in order of increasing complexity of quality analysis factors.

In some embodiments, the method can include discarding the facial image and/or storing the facial image in the memory when the facial image does not pass at least one of the number of quality analysis filters. In an example, the method can include discarding and/or storing the facial image when the facial image does not pass one of the number of quality analysis filters. For instance, the facial image can be discarded and/or stored when the facial image does not pass a quality analysis filter associated with the face size of the facial image.

Alternatively, and/or in addition, the facial image can be discarded and/or stored when the image does not pass a plurality of quality analysis filters. For example, where three quality analysis filters are employed as a plurality of quality analysis filters, the facial image can proceed through the three quality analysis filters when the facial image fails two out of the three quality analysis filters.

In some embodiments, the method can include filtering the facial image with a plurality of quality analysis filters. Using a plurality of quality analysis filters can allow for increased filtering of facial images before they are processed by the facial recognition program. For example, facial images that are more refined in terms of overall image quality can be submitted to the facial recognition program because the facial images can be passed through additional filters.

In some embodiments, the method can include determining whether an overall image quality of the facial image has converged. In an example, a determination can be made whether the overall image quality has converged by analyzing a trend of the overall image quality. For instance, the overall image quality of the facial image can be determined to converge when the overall image quality converges upon a set value or a configured value.

Alternatively, and/or in addition, the method can include determining whether an overall image quality of the facial image will converge. In an example, a determination can be made whether the overall image quality will converge by analyzing a trend of the overall image quality, as discussed herein. For instance, the trend of the overall image quality of the facial image can be analyzed to determine whether the overall image quality of the facial images continues to increase, decrease, and/or stay the same.

At block 106, the method includes submitting the facial image to a facial recognition program upon a determination that the facial image has passed the number of quality analysis filters. Processing involved in facial recognition performed by the facial recognition program can take into account the facial image and identity data of known individuals that can be stored in a database.

In some embodiments, the method can include receiving identity data from the facial recognition program in response to submitting the facial image to the facial recognition program when the facial image passes the number of quality analysis filters. In an example, when the facial image passes the number of quality analysis filters, the facial image can be submitted to the facial recognition program, enabling the program to produce the identity data. Alternatively, and/or in addition, the facial recognition program can return an identity probability indicative of an accuracy of an identity of an individual.

Figure 2:
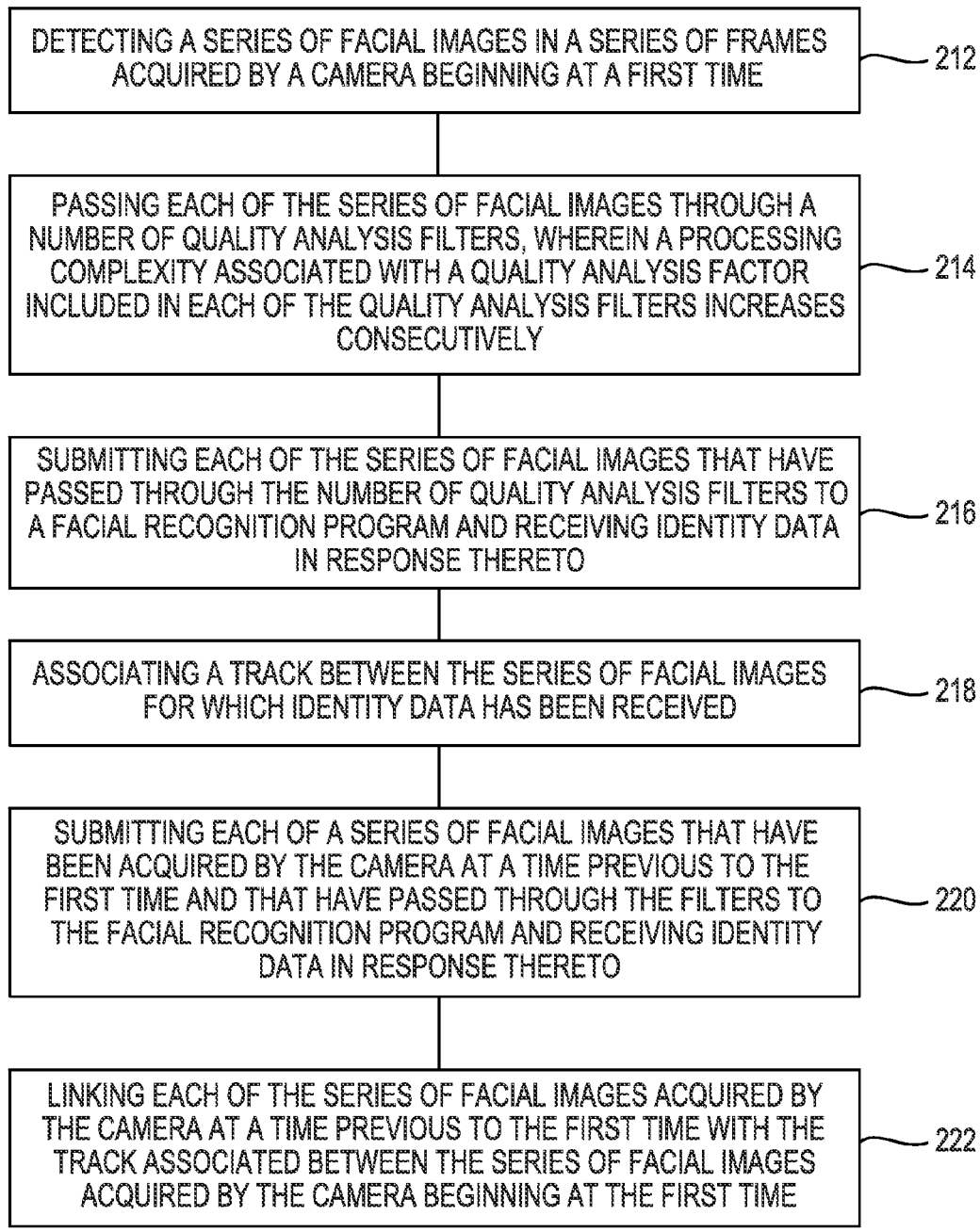
FIG. 2 illustrates a method for face image prioritization based on face quality analysis according to one or more embodiments of the present disclosure.

FIG. 2 illustrates a method for face image prioritization based on face quality analysis according to one or more embodiments of the present disclosure. At block 212, the method includes detecting a series of facial images in a series of frames acquired by a camera beginning at a first time. Each of the facial images can be included in each respective frame acquired by the camera.

In a manner such as that discussed in relation to FIG. 1, the method can include passing each of the series of facial images through a number of quality analysis filters, wherein a processing complexity associated with a quality analysis factor included in each of the quality analysis filters increases consecutively, at block 214. In an example, a determination can be made at each quality analysis filter of whether each of the series of facial images passes each quality analysis filter by analyzing each of the series of facial images in relation to a quality analysis factor associated with each of the number of quality analysis filters.

If a facial image does not pass at least one of the number of quality analysis filters, the facial image can be discarded and/or stored in a memory. In an example, each of the series of facial images can be passed through the number of quality analysis filters and a facial image that has failed a plurality of quality analysis filters can be discarded.

The quality analysis filters can be arranged in a series such that each of the series of facial images can pass through each of the number of quality analysis filters. As each of the series of facial images passes through the number of quality analysis filters, each facial image can be subjected to quality analysis factors of increasing processing complexity. For example, processing complexity can increase consecutively between the quality analysis factors associated with each of the number of quality analysis filters.

In some embodiments, the method can include storing a number of facial images that have an overall image quality exceeding a threshold image quality and discarding additional images that do not exceed the threshold image quality. Discarding additional images that do not exceed the threshold image quality can reduce processing resources utilized by the facial analysis program because the images are discarded rather than processed by the facial analysis program.

In some embodiments, the method can include varying the number of facial images that are stored based on demands for facial image processing. In an example, the method can include increasing and/or decreasing the number of facial images that are stored based on demands for facial image processing. For instance, where multiple individuals in a scene need to be identified and thus demand for processing resources by the facial identification program are high, the number of facial images that are stored can be decreased. Alternatively, and/or in addition, where there are less individuals in the scene and thus demand for processing resources by the facial identification program are lower, the number of facial images that are stored can be increased.

In some embodiments, the method can include stopping the processing of facial images associated with a track of facial images when a number of images exceeding a threshold image quality are obtained. By stopping processing of the track of facial images, processing resources can be used to process facial images associated with other tracks of facial images.

The method includes, at block 216, submitting each of the series of facial images that have passed through the number of quality analysis filters to a facial recognition program and receiving identity data in response thereto. By passing the series of facial images through the number of quality analysis filters, some of the facial images that are not of a requisite quality to be processed by the facial recognition program can be discarded and/or stored in memory, thus decreasing the number of facial images submitted to the facial recognition program. Alternatively, and/or in addition, an overall image quality of the images submitted to the facial recognition program can be increased by discarding and/or storing in memory images that are not of a requisite quality to be processed by the facial recognition program.

At block 218, the method includes associating a track between the series of facial images for which identity data has been received. As discussed herein, a track of facial images can be defined as a group of facial images from different frames that are likely of the same individual. In an example, the identity data that has been received for each of the series of facial images can be compared. Based on the comparison of the identity data for each of the series of facial images, the facial images can be linked together and/or associated as a track of facial images.

The method includes, at block 220, submitting each of a series of facial images that have been acquired by the camera at a time previous to the first time and that have passed through the filters to the facial recognition program and receiving identity data in response thereto. The series of facial images that have been acquired by the camera at a time previous to the first time can be defragmented. For example, the series of facial images may not be associated with a track and/or the series of facial images and/or a number of facial images in the series of facial images may be associated with an incomplete track.

A defragmented and/or incomplete track can be caused when faces of two or more individuals cross when images are being acquired by the camera. A track that is defragmented and/or incomplete can pose challenges when determining a path that has been taken by an individual associated with the series of facial images. For example, when the faces of two individuals cross when images are being acquired by the camera, a false indication can be given that one or more of the tracks have ended.

At block 222, the method includes linking each of the series of facial images acquired by the camera at a time previous to the first time with the track associated between the series of facial images. In an example, the identity data received for the series of facial images that has been acquired by the camera at the time previous to the first time can be compared with the identity data associated with the series of facial images acquired by the camera beginning at the first time. A match operation can then be conducted between the identity data received for the series of facial images that has been acquired by the camera at the time previous to the first time and the identity data associated with the series of facial images acquired by the camera beginning at the first time. Upon a match between the identity data, the two series of facial images can be linked as a single track.

Figure 3:
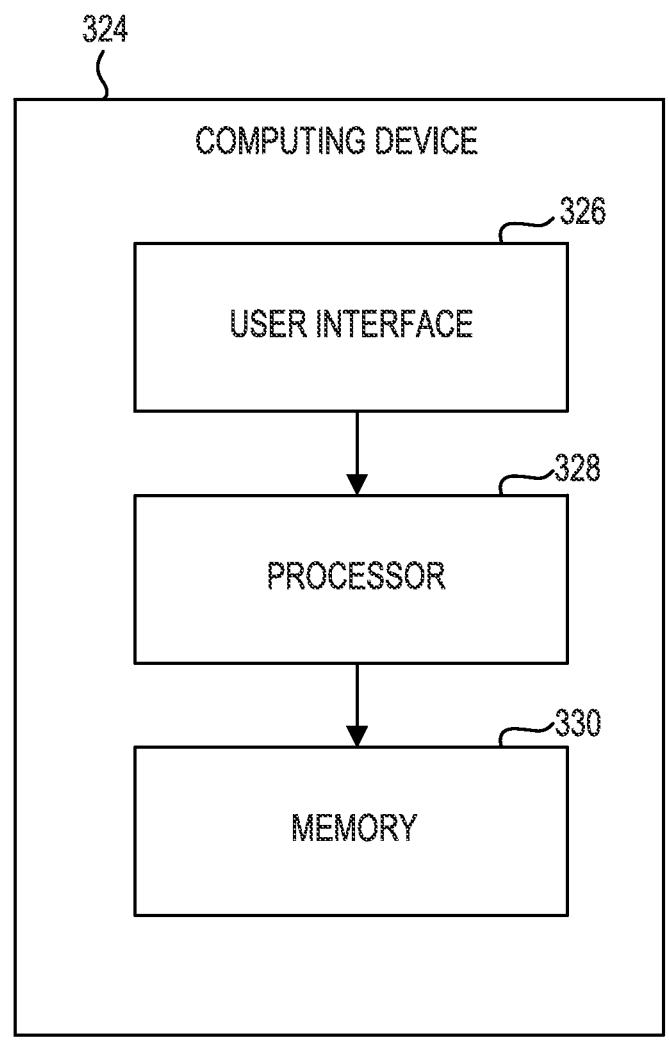
FIG. 3 illustrates a device for face image prioritization based on face quality analysis, according to one or more embodiments of the present disclosure.

FIG. 3 illustrates a device for face image prioritization based on face quality analysis, according to one or more embodiments of the present disclosure. As shown in FIG. 3, computing device 324 includes a user interface 326. User interface 326 can be a graphic user interface (GUI) that can provide (e.g., display and/or present) and/or receive information (e.g., data and/or images) to and/or from a user (e.g., operator) of computing device 324. For example, user interface 326 can include a screen that can provide information to a user of computing device 324 and/or receive information entered into a display on the screen by the user. However, embodiments of the present disclosure are not limited to a particular type of user interface.

As shown in FIG. 3, computing device 324 includes a processor 328 and a memory 330 coupled to the processor 328. Memory 330 can be volatile or nonvolatile memory. Memory 330 can also be removable (e.g., portable) memory, or non-removable (e.g., internal) memory. For example, memory 330 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 330 is illustrated as being located in computing device 324, embodiments of the present disclosure are not so limited. For example, memory 330 can also be located internal to another computing resource (e.g., enabling computer readable instructions to be downloaded over the Internet or another wired or wireless connection).

Memory 330 can also store executable instructions, such as, for example, computer readable instructions (e.g., software), for face image prioritization based on face quality analysis in accordance with one or more embodiments of the present disclosure.

Processor 328 can execute the executable instructions stored in memory 330 in accordance with one or more embodiments of the present disclosure. For example, processor 328 can execute the executable instructions stored in memory 330 to detect a facial image from a first track of facial images.

In some embodiments, the instructions can be executed to filter the facial image with a first number of quality analysis filters that include a first number of quality analysis factors. Each of the first number of quality analysis factors can be associated with each of the first number of quality analysis filters.

The first number of quality analysis factors can be factors associated with a quality of the facial image. In an example, the first number of quality analysis factors can include face size, brightness of the facial image, dynamic range of the pixels on the facial image, and/or sharpness metric, although examples are not so limited.

The first number of quality analysis filters can be arranged in series such that the facial image can pass through a first, second, and third quality analysis filter, for example. As the facial image passes through each respective quality analysis filter, the facial image can be analyzed in terms of each respective quality analysis factor. Upon analysis of the facial image in terms of each respective quality analysis factor, instructions can be executed to determine whether the facial image passes the first number of quality analysis filters.

In some embodiments, instructions can be executed to arrange the first number of quality analysis filters in order of increasing complexity of the quality analysis factors associated with each of the first number of quality analysis filters. In an example, processing associated with a first quality analysis factor can be less complex than processing associated with a second quality analysis factor, and the second quality analysis factor can be less complex than processing associated with a third quality analysis factor. For instance, face size can be a first quality analysis factor associated with a first quality analysis filter; brightness can be a second quality analysis factor associated with a second quality analysis filter; dynamic range of pixels on the facial image can be associated with a third quality analysis filter; and a fast sharpness metric can be associated with a fourth quality analysis filter.

If the facial image passes all of the quality analysis filters and/or at least one of the quality analysis filters, the facial image can be passed to a second number of quality analysis filters that includes a second number of quality analysis factors when the facial image passes the first number of quality analysis filters. The second number of quality analysis factors can include, for example, a blur estimate; landmark estimates from eyes, nose, and mouth; facial pose; shape fitting residual; and/or an overall image quality, although examples are not so limited. In an example, processing associated with the second number of quality analysis factors can be more complex than processing associated with the first number of quality analysis factors.

In a manner such as that discussed in relation to the first quality analysis filters, the method can include arranging the second number of quality analysis filters in order of increasing complexity of the quality analysis factors associated with each of the second number of quality analysis filters. In an example, by arranging the second number of quality analysis filters in order of increasing complexity of the quality analysis factors, the least amount of processing can be performed on images that are not of a requisite quality for processing by the facial recognition program.

In some embodiments, the facial image can be filtered with a second plurality of quality analysis filters. As discussed herein, using a plurality of quality analysis filters can allow for increased filtering of facial images before they are processed by the facial recognition program. For example, facial images that are more refined in terms of overall image quality can be submitted to the facial recognition program when the facial images have been passed through more filters.

The first number of quality analysis filters and the second number of quality analysis filters can be placed in series such that the facial image passes from one quality analysis filter to a next quality analysis filter. As the facial image passes from one quality analysis filter to the next quality analysis filter, the facial image can be subjected to a quality analysis factor that is associated with more complex processing than a quality analysis factor associated with a previous quality analysis filter.

In some embodiments, the instructions can be executed to determine an overall image quality of the facial image based on the first number of quality analysis factors and the second number of quality analysis factors. As discussed herein, the overall image quality can be defined as a summation and/or average of one or more values associated with each respective quality analysis factor. The overall image quality can be representative of whether the facial image is likely to provide a useful and/or credible outcome from the facial recognition program.

In some embodiments, the instructions can be executed to determine a matching confidence between the facial image and a stored facial image with a facial recognition program based on the overall image quality. In an example, the matching confidence between the facial image and the stored facial image can be correlated with the overall image quality. For instance, as the overall image quality of the facial image increases, facial features, for example, can become more recognizable and/or distinguished thus allowing a facial recognition program to make a more confident match between the facial image and the stored facial image.

In some embodiments, the instructions can be executed to assign a priority to the first track of facial images based on the matching confidence and the overall image quality of the facial image. The priority assigned to the first track of facial images can include a priority associated with performing facial recognition on facial images included in the first track of facial images. For example, if the matching confidence and/or overall image quality of the facial image is high, a low priority can be assigned to the first track of facial images because requisite facial images have already been obtained for processing by the facial recognition program. Alternatively, and/or in addition, if the matching confidence and/or overall image quality of the facial image is low, a high priority can be assigned to the first track of facial images because requisite facial images have not been obtained for processing by the facial recognition program.

In some embodiments, the instructions can be executed to determine whether to continue processing images from the first track of facial images by comparing the priority of the first track of facial images with a priority of a second track of facial images. For example, if the priority of the second track of facial images is lower than the priority of the first track of facial images, processing of the first track of facial images can be slowed and/or stopped and/or a processing of the second track of facial images can be started and/or a speed of the processing of the second track of facial images can be increased. Processing a track of facial images with the lowest priority can ensure that processing resources are not wasted on tracks of facial images from which images suitable for analysis by the facial recognition program have been obtained.

In some embodiments, the instructions can be executed to process images of the second track of facial images when the priority of the second track of facial images is greater than the priority of the first track of facial images. Alternatively, and/or in addition, the instructions can be executed to process images of the first track of facial images when the priority of the first track of facial images is greater than the priority of the second track of facial images.

In some embodiments, instructions can be executed to assign a priority to the first track based on face size in the facial image. Face size can be indicative of how soon an individual will reach a position that is out of a field of view of the camera. In an example, a large face size in the facial image can indicate that an individual associated with the facial image is closer to the camera than a small face size in the facial image. For instance, as an individual nears the camera, the face size of the individual can increase, indicating the individual is nearing a position that is outside of the field of view of the camera.

As such, the facial image can be processed before a facial image with a small face size, which can indicate the individual is farther from the camera and also farther from a position outside of the field of view of the camera. Since more time can exist before the individual with the small face size nears a position outside of the field of view of the camera and less time can exist before the individual with the large face size nears a position outside of the field of view of the camera, the larger face size can be assigned a higher priority to ensure that the facial image associated with the large face size is processed.

Alternatively, and/or in addition, instructions can be executed to assign a priority to the first track based on face speed in the facial image. A facial image associated with a high face speed can be assigned a higher priority than a facial image associated with a lower face speed. In an example, a facial image with a high face speed can suggest that an individual associated with the facial image may be near a position that is out of a field of view of the camera more quickly than an individual associated with a facial image with a lower speed.

For instance, the individual with the high face speed can be traveling more quickly than the individual with the low face speed. Since more time can exist before the individual with the low face speed nears a position outside of the field of view of the camera and less time can exist before the individual with the high face speed nears a position outside of the field of view of the camera, the facial image associated with the high face speed can be assigned a higher priority to ensure that the facial image associated with the high face speed is processed.

In some embodiments, the instructions can be executed to determine when overall image quality of the facial image will improve based on a model of overall image quality and to delay filtering of a facial image based on the determination of when overall image quality of the facial image will improve. Environmental factors can affect overall image quality. For example, a hallway with lights positioned along a hallway that are set a distance apart can provide different lighting to different areas of the hallway.

For instance, as an individual moves down the hallway, lighting conditions can change from the individual being shaded when the individual is between the lights to the individual being illuminated when the individual is under the lights, for example. In some embodiments, a model of illumination quality and/or overall image quality can be created. The model of illumination quality and/or overall image quality can model trends of illumination quality and/or overall image quality.

In an example, the modeled trends of illumination quality and/or overall image quality can be used to delay processing of the facial image until the individual reaches a location that has been modeled by the illumination quality and/or overall image quality models as being a suitable location in terms of illumination quality and/or overall image quality. By delaying processing of the facial image, processing resources can be saved and a higher overall image quality of the facial image can be obtained.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

What is claimed:

1. A method for face image prioritization based on face image prioritization based on face quality analysis:
   detecting a facial image from a first track of facial images;
   filtering the facial image with a first number of quality analysis filters that include a first number of quality analysis factors;
   passing the facial image to a second number of quality analysis filters that includes a second number of quality analysis factors when the facial image passes the first number of quality analysis filters, wherein processing associated with the second number of quality analysis factors is more complex than processing associated with the first number of quality analysis factors;
   determining an overall image quality of the facial image based on the first number of quality analysis factors and the second number of quality analysis factors;
   determining a matching confidence between the facial image and a stored facial image with a facial recognition program based on the overall image quality; and
   assigning a priority to the first track of facial images based on the matching confidence and the overall image quality of the facial image; and
   determining whether to continue processing images from the first track of facial images by comparing the priority of the first track of facial images with a priority of a second track of facial images.

2. The method of claim 1, wherein at least one of the first and second number of quality analysis factors includes at least one of face size; brightness of the facial image; dynamic range of pixels on the facial image; a sharpness metric; a blur estimate; landmark estimates from eyes, nose, and mouth; facial pose; a shape fitting residual; and an overall image quality.

3. The method of claim 2, further comprising arranging the first number of quality analysis filters in order of increasing complexity of the quality analysis factors associated with each of the number of quality analysis filters.

4. The method of claim 1, further comprising discarding the facial image when the facial image does not pass at least one of the number of quality analysis filters.

5. The method of claim 1, further comprising receiving identity data from the facial recognition program in response to submitting the facial image to the facial recognition program when the facial image passes the first number of quality analysis filters.

6. The method of claim 1, wherein filtering the facial image with the first number of quality analysis filters includes filtering the facial image with a plurality of quality analysis filters.

7. The method of claim 1, further comprising determining whether an overall image quality of the facial image has converged.

8. A machine-readable non-transitory medium storing instructions for face image prioritization based on face quality analysis, executable by a machine to cause the machine to:
   detect a facial image from a first track of facial images;
   filter the facial image with a first number of quality analysis filters that include a first number of quality analysis factors;
   pass the facial image to a second number of quality analysis filters that includes a second number of quality analysis factors when the facial image passes the first number of quality analysis filters, wherein processing associated with the second number of quality analysis factors is more complex than processing associated with the first number of quality analysis factors;
   determine an overall image quality of the facial image based on the first number of quality analysis factors and the second number of quality analysis factors;
   determine a matching confidence between the facial image and a stored facial image with a facial recognition program based on the overall image quality; and
   assign a priority to a first track of facial images based on the matching confidence and the overall image quality of the facial image; and
   determine whether to continue processing images from the first track of facial images by comparing the priority of the first track of facial images with a priority of a second track of facial images.

9. The medium of claim 8, wherein the first number of quality analysis factors includes at least one of face size, brightness of the facial image, dynamic range of pixels on the facial image, and a sharpness metric.

10. The medium of claim 9, further comprising instructions executable by the machine to arrange the first number of quality analysis filters in order of increasing complexity of the quality analysis factors associated with each of the number of quality analysis filters.

11. The medium of claim 8, wherein the second number of quality analysis factors includes at least one or a blur estimate; landmark estimates from eyes, nose, and mouth; facial pose; a shape fitting residual; and an overall image quality.

12. The medium of claim 11, further comprising instructions executable by the machine to arrange the second number of quality analysis filters in order of increasing complexity of the quality analysis factors associated with each of the second number of quality analysis filters.

13. The medium of claim 8, further comprising instructions executable by the machine to process images of the second track of facial images when the priority of the second track of facial images is greater than the priority of the first track of facial images.

14. The medium of claim 8, further comprising instructions executable by the machine to determine when overall image quality of the facial image will improve based on a model of overall image quality; and
   further comprising instructions executable by the machine to delay filtering of a facial image based on the determination of when overall image quality of the facial image will improve.

15. The medium of claim 8, further comprising instructions executable by the machine to assign a priority to the first track based on at least one of face size in the facial image and face speed in the facial image.

16. The method of claim 1, further comprising:
   storing a number of facial images that have an overall image quality exceeding a threshold image quality; and
   discarding additional images that surpass the threshold image quality.

17. The method of claim 16, further comprising varying the number of facial images that are stored based on demands for facial image processing.

* * * * *